Patented Dec. 13, 1927.

1,652,393

UNITED STATES PATENT OFFICE.

CHARLES COPLAND, OF CHICAGO, ILLINOIS, ASSIGNOR TO INTERNATIONAL PATENTS DEVELOPMENT COMPANY, OF WILMINGTON, DELAWARE, A CORPORATION OF DELAWARE.

METHOD OF MAKING DEXTROSE.

No Drawing.  Application filed November 30, 1925. Serial No. 72,406.

My invention relates to an improvement in the method of manufacturing crystalline dextrose whereby the yield of dextrose in a crystalline state from a given amount of dextrose solution may be materially increased.

The invention is based upon the discovery that if the mother liquor or hydrol drained, by centrifuging for example, from the crystallized dextrose, be mixed with a crystallized dextrose solution, in which crystallization has proceeded as far as is practicable, additional crystals can be produced by further supersaturation of the mixture, that is, by second crystallizing or curing operation, as is evidenced by the fact that when the magma thus produced is centrifuged the hydrol will have a substantially lower dextrose content than the hydrol withdrawn from the first mentioned batch. For example, the hydrol spun from the once cured crystal mass may contain as high as 70% of dextrose, while the hydrol withdrawn from the re-cured mixture of hydrol and crystallized solution may have as low a dextrose content as 60%. The economy effected by this improvement will be obvious when one considers the very great difference in market value between crystalline dextrose and hydrol, especially as the reduced percentage of dextrose in the hydrol does not materially affect the value and usefulness of the hydrol for the purpose for which it is used.

The reason why it is possible in this way to obtain a larger net yield from the dextrose solution seems to be that the slightly reduced specific gravity of the magma due to its dilution by the hydrol establishes a new balance between dextrose in the liquid and solid phases favorable to further crystallization of the dextrose in solution. The fact that the existent solid phase will circulate more freely through the liquor, as the result of the dilution, may be a factor in producing this result. However, whatever the reasons may be, operation of the improved process on a large scale has demonstrated the possibility of obtaining the increased yield in the manner described.

The improvement of my present invention may be utilized with particular advantage in connection with the second crystallizing operation of the two-boiling process, so-called, as described in the patent to Newkirk No. 1,471,347, October 23, 1923, as modified, if desired, by the improvements of Newkirk Patent No. 1,521,830, granted January 6, 1925; or the improvement could be utilized in connection with the third crystallizing operation in the three-boiling process described in the first of these patents; or in connection with other methods of manufacturing crystalline dextrose involving centrifuging of a crystallized solution while in the fluent condition.

In the two-boiling process above referred to, the mother liquor or hydrol centrifuged from the first magma of crystals and liquid is re-crystallized, preferably after concentration, and the magma of crystals and liquid obtained by the second crystallizing operation is centrifuged so as to give a second yield of crystals and a body of mother liquor which latter has not ordinarily been retreated but has been sold as a by-product at a relatively low price.

According to my improvement this "second hydrol", instead of being withdrawn from the process, as contemplated by the two-boiling method, is utilized for diluting a crystallized solution not susceptible to further crystallization or at least without the danger of producing false grain which will prevent the complete purging of the mother liquor, and the diluted crystal magma is then supersaturated to induce the further growth of crystals. For example, instead of centrifuging the entire batch of crystals and liquid produced by recrystallization of the hydrol, a portion only of the batch is centrifuged, preferably about half of the batch, and the hydrol is returned to the crystallizer and the mixture of original magma and hydrol is then subjected to another crystallizing operation for such time as may be necessary in order to develop as many new crystals as possible. I have found that this re-crystallizing operation will take ordinarily about three days (the first crystallizing operation taking about five days and the second about ten according to present practice under the patents above referred to), during which time the solid phase is kept in a dispersed state in the liquor, as in the preceding crystallizing operation, by means of the agitator with which the crystallizer is provided. The supersaturation of the mass is obtained and maintained either by merely allowing the mass to cool or, if necessary (the crystallizing operation being exothermic), by the circulation of cold water through the water jacket of the crystallizer; or the mass may be heated by the circulation of warm water through the jacket if this becomes necessary at any stage. However, the conditions necessary to produce a growth of crystals of such character that the magma can be centrifuged, including proper temperatures and densities, are set forth in detail in the patents above referred to and need not be repeated here.

When the crystallizing operation is completed the magma is centrifuged, with the reservation of a certain part, if desired, for seeding the next batch in accordance with the principles of Patent No. 1,521,830.

While I have described the improvement of this invention as utilized at a certain stage of the manufacture of crystalline dextrose now being carried on on a large scale, and have set forth the way in which said improvement is utilized, it will be understood that I desire to cover by Letters Patent all uses to which my improvement can be put, and all methods by which it may be put into practice, within the scope of the appended claims.

I claim:

1. Improvement in the manufacture of crystalline dextrose which consists in mixing with a magma of dextrose solution and crystals mother liquor purged from another mass of dextrose crystals, subjecting this mixture to a crystallizing operation while maintaining the crystals dispersed and in motion through the liquid, and then separating the liquor from the dextrose.

2. Improvement in the manufacture of crystalline dextrose which consists in mixing with a magma of dextrose solution and crystals, in which crystallization has been carried as far as possible, mother liquor purged from another mass of dextrose crystals of substantially the same quantity as the crystals in said magma, subjecting the mixture to a crystallizing operation by reduction of temperature while maintaining the crystals dispersed and in motion through the liquid, and then separating the mother liquor from the crystalline dextrose while the mass is in a fluent state.

3. Improvement in the manufacture of crystalline dextrose which comprises subjecting a dextrose solution to a crystallizing operation and purging substantially half of the magma of its mother liquor, mixing this mother liquor with the other half of the magma, subjecting the mixture to another crystallizing operation by reduction of temperature, and purging the magma derived from this operation of its mother liquor.

4. Improvement in the manufacture of crystalline dextrose which comprises subjecting a dextrose solution to a crystallizing operation with the crystals dispersed and in motion in the liquid and purging a portion of the magma of its mother liquor while the mass is in a fluent state, mixing this mother liquor while the mass is in a fluent state with the remainder of the magma, subjecting the mixture to another crystallizing operation with the crystals dispersed and in motion in the liquid, and purging the magma derived from this operation of its mother liquor.

5. Improvement in the manufacture of crystalline dextrose which comprises subjecting a dextrose solution to a crystallizing operation to crystallize as much as possible of the dextrose in said solution, and purging a portion of the magma of its mother liquor, mixing this mother liquor with the remainder of the magma, subjecting the mixture to another crystallizing operation by reduction of temperature, and purging the magma derived from this operation of its mother liquor.

6. Improvement in the manufacture of crystalline dextrose which comprises subjecting a dextrose solution to a crystallizing operation with the crystals dispersed and in motion in the liquid, to crystallize as much as possible of the dextrose in said solution, and purging a portion of the magma of its mother liquor while the mass is in a fluent state, mixing this mother liquor while the mass is in a fluent state with the remainder of the magma, subjecting the mixture to another crystallizing operation with the crystals dispersed and in motion in the liquid, and purging the magma derived from this operation of its mother liquor.

7. Improvement in the manufacture of crystalline dextrose which comprises subjecting a dextrose solution to a crystallizing operation with the crystals dispersed and in motion in the liquid, and purging substantially half of the magma of its mother liquor while the mass is in a fluent state, mixing this mother liquor while the mass is in a fluent state with the other half of the magma, subjecting the mixture to another crystallizing operation with the crystals dispersed and in motion in the liquid, and purging the magma derived from this operation of its mother liquor.

8. Improvement in the manufacture of crystalline dextrose which comprises subjecting a dextrose solution to a crystallizing operation and purging the magma of its mother liquor, subjecting the mother liquor to a second crystallizing operation and purging a portion of the resultant magma of its mother liquor; and mixing with the remaining portion of said magma mother liquor from a previous purging operation, subjecting this mixture to a crystallizing operation by reduction of temperature, and then purging the resultant magma of its mother liquor.

9. Improvement in the manufacture of crystalline dextrose which comprises subjecting a dextrose solution to a crystallizing operation and purging the magma of its mother liquor, subjecting the mother liquor to a second crystallizing operation and purging a portion of the resultant magma of its mother liquor; and mixing with the remaining portion of said magma mother liquor from said last mentioned purging operation, subjecting this mixture to a crystallizing operation, and then purging the resultant magma of its mother liquor.

10. Improvement in the manufacture of crystalline dextrose which comprises subjecting a dextrose solution to a crystallizing operation and purging the magma of its mother liquor, subjecting the mother liquor to a second crystallizing operation and purging substantially half of the resultant magma of its mother liquor; and mixing with the other half of said magma mother liquor from a previous purging operation, subjecting this mixture to a crystallizing operation, and then purging the resultant magma of its mother liquor.

11. Improvement in the manufacture of crystalline dextrose which comprises subjecting a dextrose solution to a crystallizing operation with the crystals dispersed and in motion through the liquid, subjecting the mother liquor while in a fluent state to a second crystallizing operation with the crystals dispersed and in motion through the liquid, and purging a portion of the resultant magma of its mother liquor while in a fluent state; and mixing with the remaining portion of said magma mother liquor from a previous purging operation, subjecting this mixture to a crystallizing operation, and then purging the resultant magma of its mother liquor.

12. Improvement in the manufacture of crystalline dextrose which comprises subjecting a dextrose solution to a crystallizing operation with the crystals dispersed and in motion through the liquid, subjecting the mother liquor while in a fluent state to a second crystallizing operation with the crystals dispersed and in motion through the liquid, and purging a portion of the resultant magma of its mother liquor while in a fluent state; and mixing with the remaining portion of said magma mother liquor from said last mentioned purging operation, subjecting this mixture to a crystallizing operation, and then purging the resultant magma of its mother liquor.

13. Improvement in the manufacture of crystalline dextrose which comprises subjecting a dextrose solution to a crystallizing operation with the crystals dispersed and in motion through the liquid, subjecting the mother liquor while in a fluent state to a second crystallizing operation with the crystals dispersed and in motion, and purging substantially half of the resultant magma of its mother liquor while in a fluent state; and mixing with the other half of said magma mother liquor from a previous purging operation, subjecting this mixture to a crystallizing operation, and then purging the resultant magma of its mother liquor.

CHARLES COPLAND.